(12) United States Patent
Pearson

(10) Patent No.: US 6,777,923 B2
(45) Date of Patent: Aug. 17, 2004

(54) SYSTEM AND METHOD FOR DETECTING A CONCEALED CURRENT CARRYING CONDUCTOR

(75) Inventor: Richard David Pearson, Bristol (GB)

(73) Assignee: Radiodetection Limited (GB)

( * ) Notice: Subject to any disclaimer, the term of this patent is extended or adjusted under 35 U.S.C. 154(b) by 0 days.

(21) Appl. No.: 10/367,983

(22) Filed: Feb. 19, 2003

(65) Prior Publication Data

US 2003/0155906 A1 Aug. 21, 2003

Related U.S. Application Data

(60) Provisional application No. 60/357,117, filed on Feb. 19, 2002.

(51) Int. Cl.[7] ............................. G01R 33/00; G01V 3/08
(52) U.S. Cl. ............................. 324/127; 324/326; 175/45
(58) Field of Search ................. 324/67, 127, 207.17, 324/213, 263, 326–329, 345–346; 175/45

(56) References Cited

U.S. PATENT DOCUMENTS

| 4,263,552 A | | 4/1981 | Weber ........................ 324/326 |
| 4,686,454 A | * | 8/1987 | Pecukonis .................... 324/67 |
| 4,691,165 A | | 9/1987 | Szedlmajer .................. 324/326 |
| 5,043,666 A | * | 8/1991 | Tavernetti et al. .......... 324/326 |
| 5,621,325 A | | 4/1997 | Draper et al. ............... 324/326 |
| 6,107,801 A | * | 8/2000 | Hopwood et al. .......... 324/326 |

FOREIGN PATENT DOCUMENTS

| GB | 2004069 | 3/1979 |
| GB | 2075199 | 11/1981 |

OTHER PUBLICATIONS

International Search Report dated Jul. 28, 2003.

* cited by examiner

Primary Examiner—Minh N. Tang
(74) Attorney, Agent, or Firm—Baker & Hostetler, LLP

(57) ABSTRACT

A system and method for detecting a concealed current carrying conductor is presented. A first and a second field strength signal proportional to an electromagnetic field is generated. A value is determined for the first field strength signal. This value is used to divide the second field strength signal and form an indicator signal. A value for the indicator signal is determined. If the value of the indicator signal is equal to or greater than a predetermined value (i.e., not less than the predetermined value), a conductor detection signal is generated and used to alert a user to the presence of a concealed current carrying conductor.

22 Claims, 6 Drawing Sheets

```
┌─────────────────────────────────────────┐
│ METHOD FOR DETECTING A CONCEALED CURRENT │ ─ 300
│ CARRYING CONDUCTOR                       │
└─────────────────────────────────────────┘
                    │
┌─────────────────────────────────────────┐
│ GENERATE A FIRST AND A SECOND FIELD STRENGTH │
│ SIGNAL PROPORTIONAL TO AN ELECTROMAGNETIC FIELD │ ─ 302
│ OF THE CONCEALED CURRENT CARRYING CONDUCTOR │
└─────────────────────────────────────────┘
                    │
┌─────────────────────────────────────────┐
│ DETERMINE A VALUE FOR THE FIRST FIELD STRENGTH │ ─ 304
│ SIGNAL                                   │
└─────────────────────────────────────────┘
                    │
┌─────────────────────────────────────────┐
│ DIVIDE THE SECOND FIELD STRENGTH SIGNAL BY THE │
│ VALUE OF THE FIRST FIELD STRENGTH SIGNAL TO FORM │ ─ 306
│ AN INDICATOR SIGNAL                      │
└─────────────────────────────────────────┘
                    │
                   (A)
```

FIG. 5A

SYSTEM AND METHOD FOR DETECTING A CONCEALED CURRENT CARRYING CONDUCTOR

PRIORITY

This application claims priority to the provisional U.S. patent application entitled, System and Method for Detecting a Concealed Current Carrying Coductor, filed Feb. 19, 2002, having a serial No. 60/357,117, the disclosure of which is hereby incorporated by reference.

FIELD OF THE INVENTION

The present invention relates to the detection of concealed current carrying conductors.

BACKGROUND OF THE INVENTION

Detection systems for locating concealed current carrying conductors, such as buried electrical cables, are available. These available systems typically use two parallel, spaced coils to detect a magnetic field gradient of a current carrying conductor. In response to an alternating magnetic field, each coil develops an output signal. These output signals are processed separately using two analog signal processing channels. The signals generated by these two analog processing channels are compared and used to generate an audio signal that indicates to a system user whether a concealed current carrying conductor is present. See Lloyd Harold Sole, UK Patent Application GB 2,075,199, which is incorporated herein by reference in its entirety, for a more detailed description of how available detection systems operate.

While these available detection systems are able to local concealed current carrying conductors, they have limitations due to the circuitry used to process the output signals of the two coils. Such limitations include, for example, limited dynamic range, mistracking between the two analog processing channels due to the use of variable gain amplifiers, and gain drift with respect to time and temperature. These limitations, as well as other limitations, require that the available detections systems be periodically calibrated so that they will continue to operate as intended. Typically, these required calibrations must be performed manually using trimpots.

The limitations of the available detection systems such as, for example, gain drift result in inconsistent performance between two detection systems of identical make and model. Thus, there is a need for new systems and methods for detecting concealed current carrying conductors that do not suffer form the above limitations.

BRIEF SUMMARY OF THE INVENTION

A system and method for detecting a concealed current carrying conductor is presented. A first and a second field strength signal proportional to an electromagnetic field is generated. A value is determined for the first field strength signal. This value is used to divide the second field strength signal and form an indicator signal. A value for the indicator signal is determined. If the value of the indicator signal is equal to or greater than a predetermined value (i.e., not less than the predetermined value), a conductor detection signal is generated and used to alert a user to the presence of a concealed current carrying conductor.

In an embodiment, the invention is implemented using a pair of parallel, spaced coils, a digital signal processing network, and an audible indicator network. In this embodiment, each coil generates an output signal proportional to a detected electromagnetic field. The output signal of each coil is digitally filtered and processed to determine whether an electromagnetic field gradient exists that is indicative of a concealed current carrying conductor. If a magnetic field gradient exists that is indicative of a concealed current carrying conductor, a conductor detection signal is generated and used to drive an audible indicator network.

In embodiments of the present invention, at least one of the first and the second field strength signals is adjusted to decrease the value of the indicator signal that is generated. Decreasing the value of the indicator signal reduces the detection system's sensitivity to certain electromagnetic field gradients thereby enabling the detection system user to focus in on and pinpoint current carrying conductors that are closer to the detector system. In one embodiment, the first field strength signal is multiplied by a value greater than 1 to decrease the value of the indicator signal. In another embodiment, the second field strength signal is multiplied by a value between 0 and 1 to decrease the value of the indicator signal. In other embodiments, both the first and the second field strength signals are adjusted to decrease the value of the indicator signal.

As described herein, embodiments of the invention use an audible signal to alert the user of the invention to the presence of a concealed current carrying conductor. Other embodiments use a visual signal to alert the user of the invention to the presence of a concealed current carrying conductor. Still other embodiments use both an audible signal and a visual signal to alert the user of the invention to the presence of a concealed current carrying conductor.

There has thus been outlined, rather broadly, certain embodiments of the invention in order that the detailed description thereof that follows may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS/FIGURES

The accompanying figures, which are incorporated herein and form part of the specification, illustrate the present invention and, together with the description, further serve to explain the principles of the invention and to enable a person skilled in the relevant art to make and use the invention.

Figure 5B:
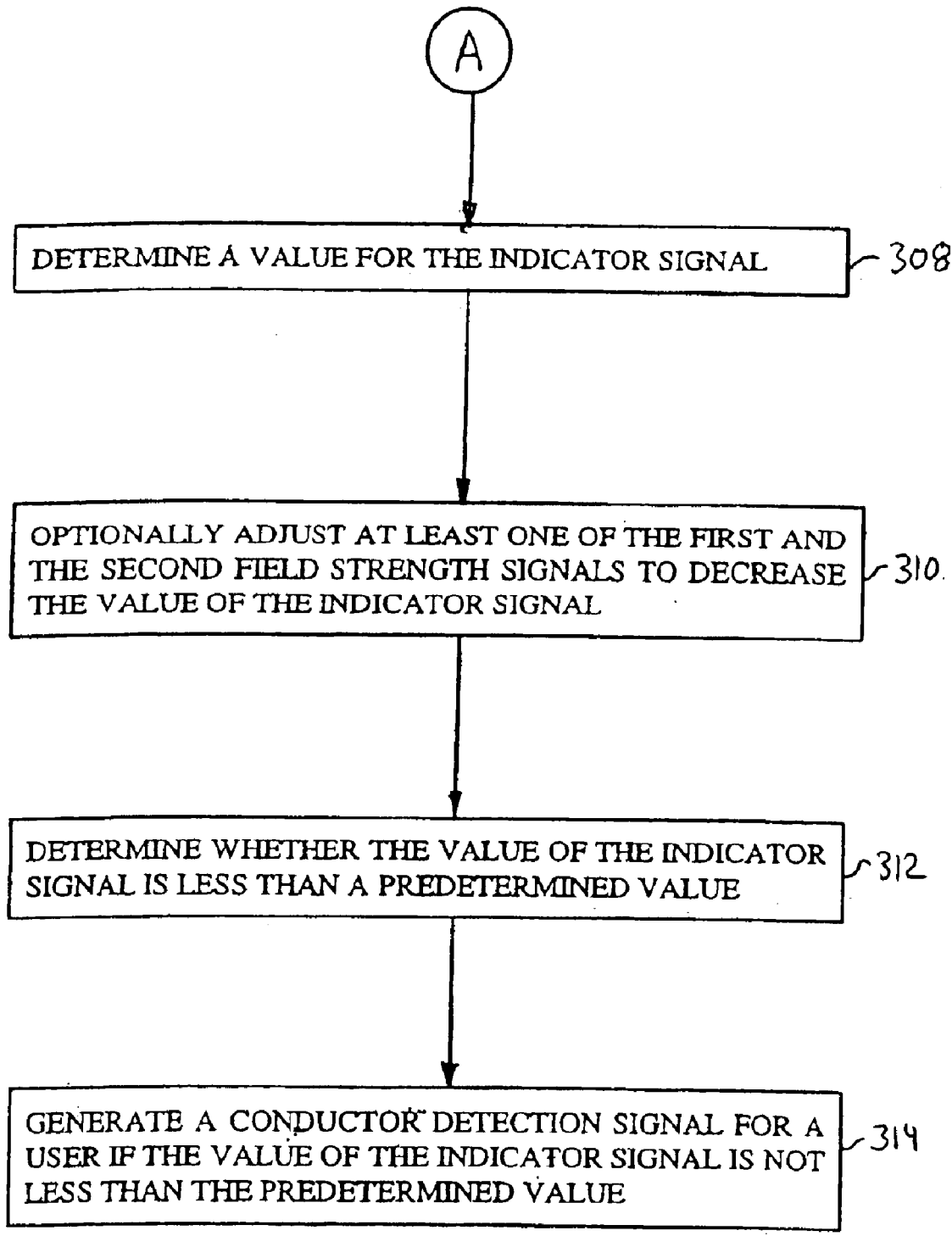

FIGS. 5A–B illustrate a flowchart of the steps of a method for detecting concealed current carrying conductors according to an embodiment of the invention.

DETAILED DESCRIPTION OF THE INVENTION

The present invention will now be described with reference to the accompanying figures. In the figures, like reference numbers indicate identical or functionally similar elements. Additionally, the left-most digit of a reference number identifies the figure in which the reference number first appears.

Figure 1:
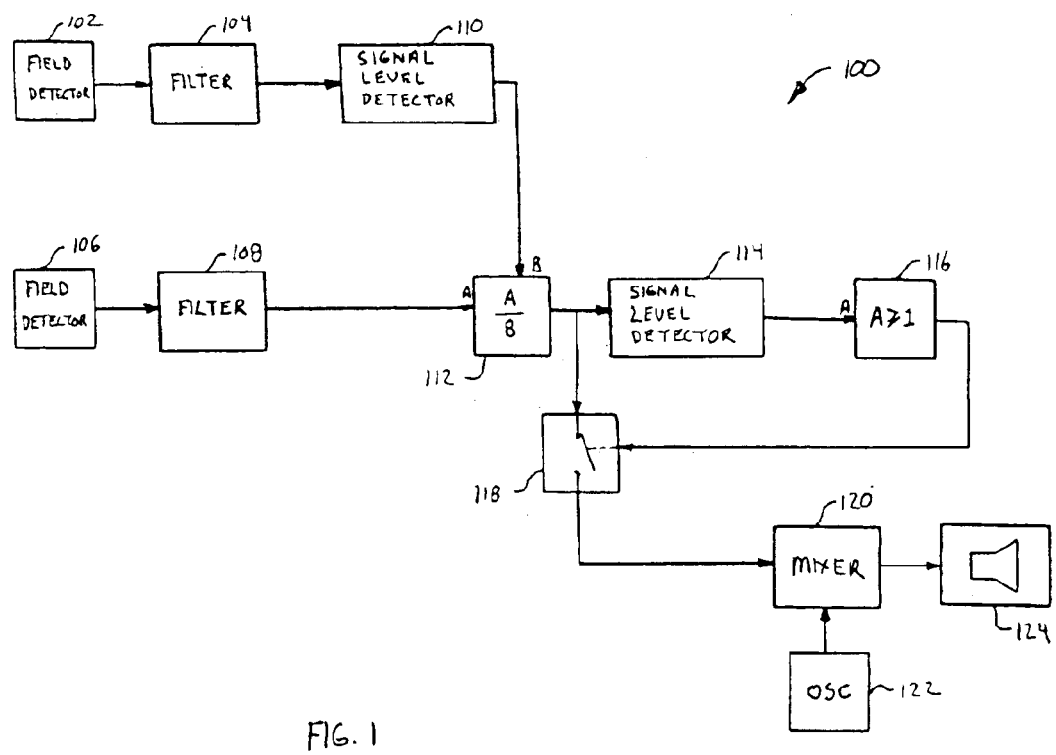
FIG. 1 illustrates a system for detecting concealed current carrying conductors according to an embodiment of the invention.

FIG. 1 illustrates a detection system 100 according to an embodiment of the invention. Detection system 100 is useful for locating concealed current carrying conductors.

System 100 can be used, for example, to search a surface area and locate buried electrical cables. It can also be used to trace and identify sewers or other non-metallic ducts or pipes to which there is access by inserting a current carrying conductor and using system 100 to locate the current carrying conductor. Furthermore, system 100 can be used to trace and identify non-metallic ducts and pipes to which there is no access if a small electrical tracer line is laid along with the non-metallic ducts and pipes during installation.

As will be understood by a person skilled in the relevant art, a current carrying conductor generates an electromagnetic field. This electromagnetic field can be detected using field detectors 102 and 106 of system 100. Field detectors 102 and 106 operate as a gradiometer to detect electromagnetic field gradients. In an embodiment, field detectors 102 and 106 are parallel, spaced coils that detect the gradients of alternating magnetic fields occurring in proximity to concealed conductors. The difference in the output signals generated by field detectors 102 and 106 is proportional to the field gradient existing between field detectors 102 and 106.

The output of field detectors 102 and 106 are filtered by filters 104 and 108. In an embodiment, filters 104 and 108 are digital filters that form part of a digital signal processing network. Filters 104 and 108 can also be formed using discrete passive and/or active electrical devices.

Signal level detector 110 is electromagnetically coupled to the output signal of field detector 102. As used herein, the phrase "electromagnetically coupled to" means an electromagnetic signal from one device or node of a network can be sensed at another device or node of the network. Such signals can be either analogue or digital. The sensed electromagnetic signal may be stored, filtered, and/or amplified, for example, before being sensed at another device or node of the network. Signal level detector 110 is used to determine a value for the output signal of field detector 102. In an embodiment, signal level detector 110 determines a root-mean-square value for the output signal of field detector 102. In another embodiment, signal level detector 110 determines an absolute value for the output of signal field detector 102. Other embodiments use other known methods such as average and peak value determinations, for determining a value for an electromagnetic signal.

Signal divider 112 is electromagnetically coupled to the output signal of field detector 106 and the output signal of signal level detector 110. Signal divider 112 divides the output signal of field detector 106 by the value determined by signal level detector 110. The output of signal divider 112 is an indicator signal representing the electromagnetic field gradient that exists between field detectors 102 and 106. If a field gradient representative of a concealed current carrying conductor is identified, this indicator signal can be used to drive an indicator that alerts a user of system 100 to the presence of the concealed current carrying conductor. In a digital signal processing embodiment of the invention, if the field strength at field detector 106 is stronger than the field strength at field detector 102, the output signal of signal divider 112 will have an absolute value greater than one. If the field strength at field detector 102 is stronger than the field strength at field detector 106, the output signal of signal divider 112 will have an absolute value less than one. If the field strength at field detector 106 is equal to the field strength at field detector 102, the output signal of signal divider 112 will have an absolute value equal to one. In other embodiments, other values may be used.

Signal level detector 114 is electromagnetically coupled to the output signal (indicator signal) of signal divider 112. Signal level detector 114 is used to determine a value for the output signal of signal divider 112. In an embodiment, signal level detector 114 determines a root-mean-square value. In another embodiment, signal level detector 114 determines an absolute value. Other embodiments use other known methods for determining a value for an electromagnetic signal.

Comparator 116 is electromagnetically coupled to the output signal of signal level detector 114. If the value determined by signal level detector 114 is greater than or equal to (i.e., not less than) a predetermined value, comparator 116 generates a first signal that can be used to close a switch 118. If the value determined by signal level detector 114 is less than a predetermined value, comparator 116 generates a second signal that can be used to open switch 118. For example, in a digital signal processing embodiment, if the value generated by comparator 116 is not less than one, comparator 116 generates an output signal that closes switch 118. If the value generated by comparator 116 is less than one, comparator 116 generates an output signal that opens switch 118. As described below, the signal generated by comparator 116 is dependent on the particular signal needed to open and close switch 118.

Switch 118 has an input port, a control port, and an output port. The input port of switch 118 is electromagnetically coupled to the output signal of signal divider 112. The control port of switch 118 is electromagnetically coupled to the output signal of comparator 116. The signal at the output port of switch 118 is electromagnetically coupled to an input port of a mixer 120. Switch 118 can be any known circuit switching device. For example, switch 118 can be any known type of field-effect transistor (FET). As an alternative, the switch can be implemented as a conditional signal path in Digital Signal Processing. The signals needed to open and close switch 118 are dependent on the particular switching device used. A person skilled in the relevant art will understand how to use and/or convert the output signal produced by comparator 116 to properly operate switch 118.

The output of switch 118 is used to drive an indicator or indicator network that alerts a user of system 100 of the presence of a concealed current carrying conductor. In an embodiment, this indicator network comprises mixer 120, an oscillator 122 and a speaker 124. Mixer 120 receives the output of switch 118 and the output from oscillator 122. The output of mixer 120 is an audio signal. This audio signal is amplified and used to drive speaker 124. Speaker 124 produces an audible signal to alert a user of system 100 to the presence of a concealed current carrying conductor.

In other embodiments of the invention, the output of switch 118 is used to drive a visual indicator. How to use the output of switch 118 to drive a visual indicator will be apparent to a person skilled in the relevant art given the description herein.

Figure 2:
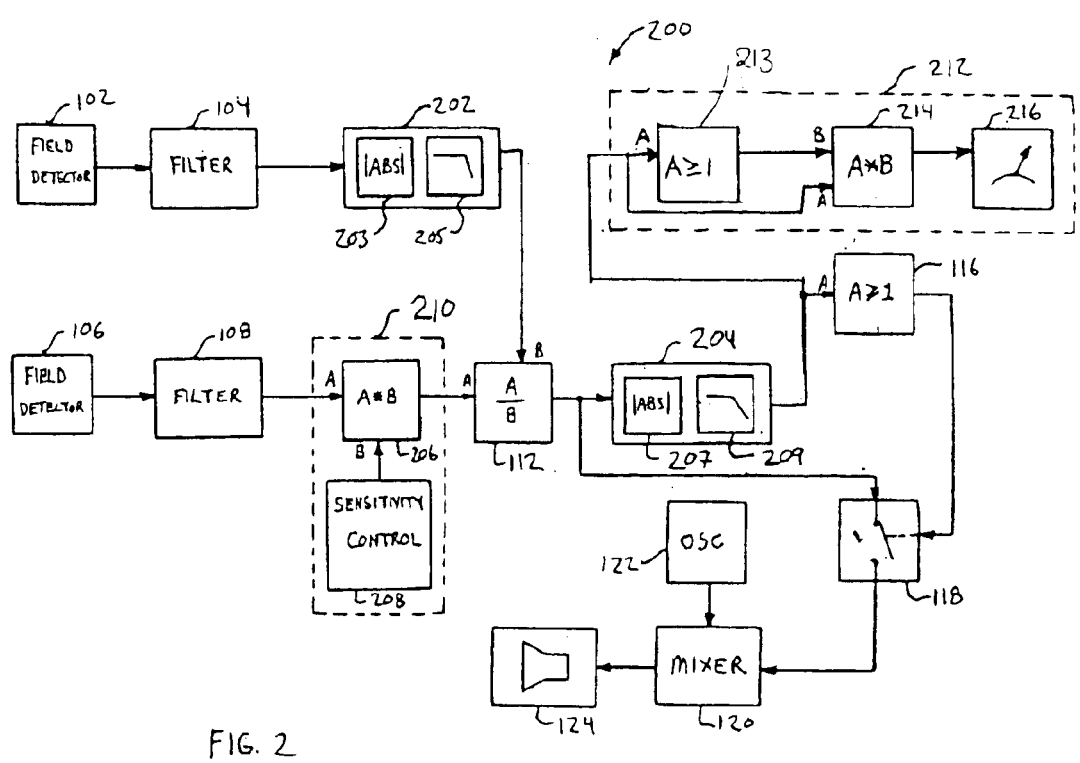
FIG. 2 illustrates a second system for detecting concealed current carrying conductors according to an embodiment of the invention.

FIG. 2 illustrates a second detection system 200 according to an embodiment of the invention. Detection system 200 is useful for locating concealed current carrying conductors. As will become apparent to a person skilled in the relevant art from viewing FIG. 2, several of the elements and features of detection system 200 are similar to the elements and features of detection system 100. Accordingly, like reference numbers have been used in FIG. 2 to indicate these identical or functionally similar elements and features.

As illustrated in FIG. 2, detection system 200 comprises two field detectors 102 and 106, two filters 104 and 108, a signal divider 112, a comparator 116, a switch 118, and an audible indicator network having a mixer 120, a beat frequency oscillator 122 and a speaker 124. These elements and features are described above with regard to FIG. 1. The reader is referred to their descriptions above.

Detection system 200 also includes features not present in detection system 100. These features will now be described with regard to FIG. 2.

Detection system 200 has a two signal level detectors 202 and 204. These two signal level detectors are similar to the signal level detectors 104 and 114 described above.

Signal level detector 202 is electromagnetically coupled to the output signal of field detector 102. Signal level detector 202 is used to determine a value for the output signal of field detector 102. In an embodiment, signal level detector 202 comprises a module 203 for determining the absolute value of the output signal generated by field detector 102 and an averaging filter 205. Other embodiments use other known methods for determining a value for an electromagnetic signal.

Signal level detector 204 is electromagnetically coupled to the output signal of signal divider 112. Signal level detector 204 is used to determine a value for the output signal (indicator signal) of signal divider 112. In an embodiment, signal level detector 204 comprises a module 207 for determining the absolute value of the output signal generated by signal divider 112 and an averaging filter 209. Other embodiments use other known methods for determining a value for an electromagnetic signal.

Detection system 200 includes a system sensitivity controller 210. System sensitivity controller 210 is used to adjust, for example, the output signal of field detector 106 and/or the output signal of signal level detector 202 in order to decrease the value of the output signal (indicator signal) of signal divider 112. The output value of signal divider 112 can be decreased, for example, by decreasing the value of the output signal of field detector 106 or by increasing the output value of field detector 102 or both. Decreasing the value of the output signal of signal divider 112 makes detection system 200 less sensitive to certain electromagnetic field gradients thereby enabling the detection system user to focus in on and pinpoint current carrying conductors that are closer to the detector system. In the embodiment illustrated in FIG. 2, system sensitivity controller 210 is used to decrease the output signal of field detector 106. Other embodiments adjust other signals at different network locations to decrease the value of the output signal (indicator signal) of signal divider 112.

As shown in FIG. 2, system sensitivity controller 210 comprises a signal multiplication module 206 and a sensitivity control 208. Signal multiplication module 206 is used to adjust a signal according to a value generated by sensitivity control 208. In the embodiment of FIG. 2, the output signal of field detector 106 is multiplied by a value between 0 and 1, which is generated by sensitivity control 208, to decrease the value of the output signal (indicator signal) of signal divider 112. In embodiments of the invention, sensitivity control 208 comprises an adjustment knob that is varied by a user during operation of detection system 200 in order to help the user pinpoint a particular concealed current carrying conductor.

Detection system 200 has a visual indicator 212. In an embodiment, indicator 212 comprises a comparator 213, a signal multiplication module 214 and a meter 216. Comparator 213 outputs a first predetermined signal if the input to comparator 213 is less than a predetermined value. In this particular embodiment the predetermined value is 1 and the first predetermined signal is a zero output signal. Comparator 213 outputs a second predetermined signal if the input to the comparator 213 is greater than or equal to the predetermined value. In this particular embodiment, the second predetermined signal is non-zero. Signal multiplication module 214 multiplies the output signal from signal level detector 204 by the output signal of signal level comparator 213. The output signal from signal multiplication module 214 is used to drive meter 216. Meter 216 will show zero deflection if the signal from field detector 102 is larger than that from system sensitivity controller 210. Meter 216 will show increasing deflection as the ratio of the signal from field detector 102 to that from system sensitivity controller decreases from 1:1. Meter 216 can have any desired scale. In other embodiments of the invention, visual indicators other than a meter are used to alert the system user to the presence of a concealed current carrying conductor.

Figure 3:
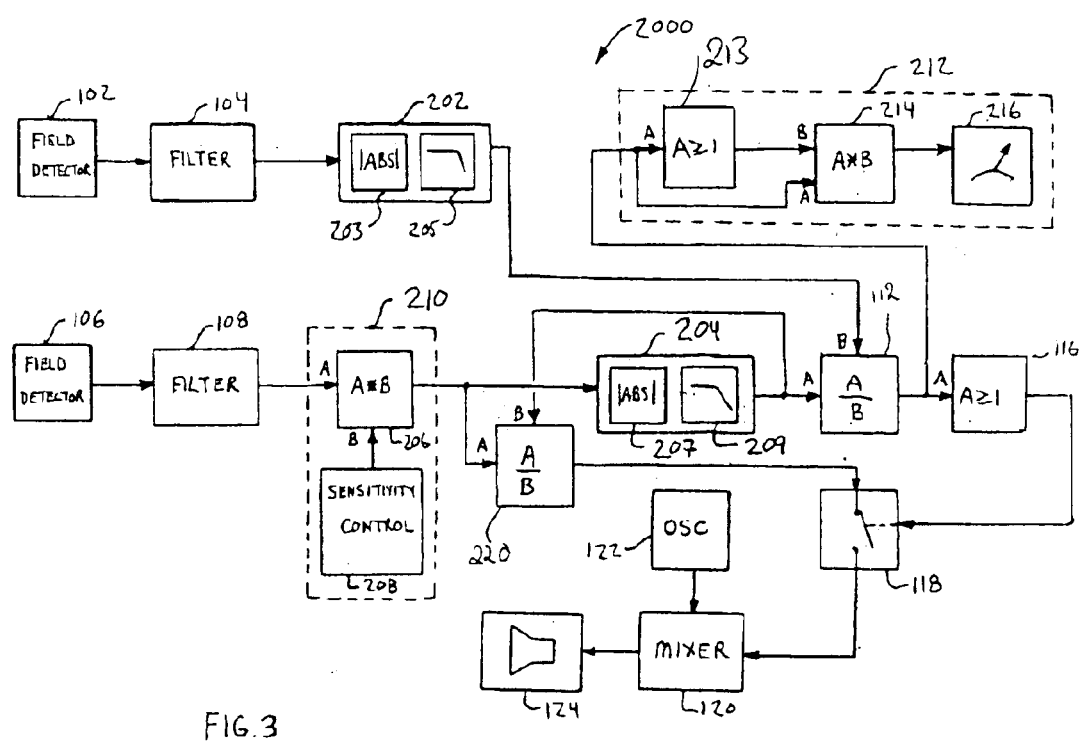
FIG. 3 illustrates a third system for detecting concealed current carrying conductors according to an embodiment of the invention.

FIG. 3 illustrates an alternative detection system 2000 based on the second detection system 200, according to an embodiment of the invention.

Detection system 2000 differs from detection system 200 in that signal level detector 204 is arranged to be between sensitivity controller 210 and signal divider 112, rather than between signal divider 112 and comparator 116. Signal level detector 204 receives a signal from system sensitivity controller 210. Signal divider 112 receives the output from signal level detector 204 and the output from signal level detector 202.

The signal from system sensitivity controller 210 is split. As well as the output being input to signal divider 112, it is also input into a second signal divider 220. Second signal divider 220 receives the output from signal level detector 204. This feedback creates a constant volume for a tone output from speaker 124. This is because the signal divider 220 self-levels its output to a constant value, which is turned on and off by switch 118.

Figure 4:
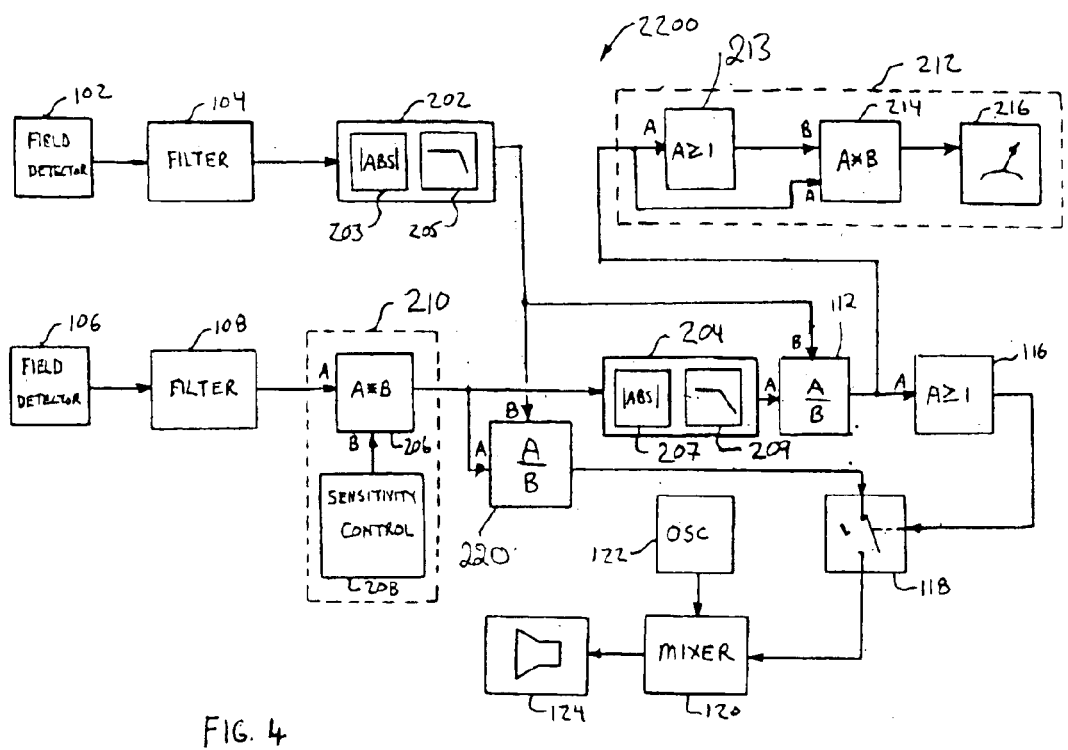
FIG. 4 illustrates a fourth system for detecting concealed current carrying conductors according to an embodiment of the invention.

FIG. 4 shows a further alternative detection system 2200 according to an embodiment of the invention. The detection system 2200 is largely the same as that of detection system 2000. However, while system sensitivity controller 210 still inputs into second signal divider 220, the other input into second signal divider 220 is from signal level detector 202, rather than signal level detector 204. This arrangement makes this embodiment output signals to a user as in the detection system 200 of FIG. 2. However, because the system configuration is very similar to that of detection system 2000 of FIG. 3, it is possible to include a switch, not shown, at the input B of second signal divider 220. The switch changes the input B between the output of signal level detector 202 and signal level detector 204, thereby changing the system between a constant volume output and variable volume output easily, and without major modification to the system.

Detection systems 100, 200, 2000 and 2200 are illustrative of the features of the invention and are not intended to limit the invention. It will be understood by those skilled in the relevant-art that various changes in form and details of the embodiments described herein may be made without departing from the spirit and scope of the invention.

FIGS. 5A and 5B illustrate a flowchart of the steps of a method 300 for detecting a concealed current carrying conductor. As described herein, method 300 has seven steps 302, 304, 306, 308, 310, 312, and 314. Step 310 is an optional step. Method 300 can be implemented using system embodiments of the present invention. The steps of method 300 will now be described.

Method 300 begins with step 302. In step 302, a first and a second field strength signal proportional to a detected electromagnetic field are generated. As will be understood by a person skilled in the relevant art, an electromagnetic field can be used to locate a concealed current carrying conductor. These field strength signals represent the strength of the detected electromagnetic field at two separated point.

In step 304, a value for the first field strength signal is determined. In an embodiment, a root-mean-square value is determined for the first field strength signal. In another embodiment, an absolute value is determined for the first field strength signal. In other embodiments, other known methods are used for determining a value for the first field strength signal.

In step 306, the second field strength signal is divided by the value of the first field strength signal, as determined in step 304, to form an indicator signal. This indicator signal is representative of the field gradient that exists between the two separated points where the first and second field strength signals are generated.

In step 308, a value is determined for the indicator signal. In an embodiment, a root-mean-square value is determined for the indicator signal. In another embodiment, an absolute value is determined for the indicator signal. In other embodiments, other known methods are used for determining a value for the indicator signal.

In optional step 310, at least one of the first and the second field strength signals is adjusted to decrease the value of the indicator signal. In one embodiment, the first field strength signal is multiplied by a value greater than 1 to decrease the value of the indicator signal. In another embodiment, the second field strength signal is multiplied by a value between 0 and 1 to decrease the value of the indicator signal. Other techniques for reducing the value of the indicator signal are used in other embodiments of the invention.

In step 312, a determination is made regarding whether the value of the indicator signal is less than a predetermined value. As described above with regards to the example system embodiments of the invention, this predetermined value is dependent on the means used to implement method 300. How to select this predetermined value will become apparent to a person skilled in the relevant art given the description herein.

In step 314, a conductor detection signal is generated for a user if the value of the indicator signal is not less than the predetermined value. This signal can be used, for example, to generate an audio and/or visual indicator device that alerts the user to the presence of a concealed current carrying conductor.

A person skilled in the relevant art will fully understand how to implement the steps of method 300 based on the detailed description of the invention herein. The steps of method 300 are illustrative and are not intended to limit the invention.

It will be understood that digital signal processing techniques can be used, and some or all of the block elements shown in the above-mentioned embodiments can be realized using digital techniques. If digital techniques are used, the term "electromagnetically coupled" includes in its definition a digital or binary signal as well as an analogue signal.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for detecting a concealed current carrying conductor, comprising:

means for generating a first and a second field strength signal proportional to an electromagnetic field of the concealed current carrying conductor;

means for determining a value for the first field strength signal;

means for dividing the second field strength signal by the value of the first field strength signal to form an indicator signal;

means for determining a value for the indicator signal;

means for determining whether the value of the indicator signal is less than a predetermined value; and means for generating a conductor detection signal for a user if the value of the indicator signal is not less than the predetermined value.

2. The system of claim 1, further comprising:

means for adjusting at least one of the first and the second field strength signals to decrease the value of the indicator signal.

3. The system of claim 1, further comprising:

means for multiplying the second field strength signal by a value between 0 and 1 to decrease the value of the indicator signal.

4. The system of claim 1, further comprising:

means for multiplying the first field strength signal by a value greater than 1 to decrease the value of the indicator signal.

5. The system of claim 1, wherein said means for generating a conductor detection signal produces an audible signal.

6. The system of claim 1, wherein said means for generating a conductor detection signal produces a visual signal.

7. The system of claim 1, further comprising:

means for multiplying the value of the conductor detection signal by the value of the indicator signal, to produce a second indicator signal; and means for generating a visual indication for a user based on the second indicator signal.

8. A system for detecting a concealed current carrying conductor, comprising:

a first and a second electromagnetic field detector arranged to detect an electromagnetic field of a current carrying conductor, said first and said second electromagnetic field detector each having an output signal;

a first and a second signal level detector that each produces an output signal at an output port that is proportional to an input signal at an input port;

a signal divider that produces an output signal at an output port that is proportional to a first input signal at a first input port divided by a second input signal at a second input port;

a comparator that produces an output value at an output port equal to a first control value, if an input signal at an input port is less than a predetermined value, and equal to a second control value, if the input signal is not less than the predetermined value;

a switch having an input port, an output port, and a control port that controls the operation of said switch; and an indicator that provides an indication to a user of an input signal at an input port;

wherein the output signal of said first electromagnetic field detector is electromagnetically coupled to said input port of said first signal level detector, the output signal of said second electromagnetic field detector is electromagnetically coupled to said first input port of said signal divider, the output signal of said first signal level detector is electromagnetically coupled to said second input port of said signal divider, the output signal of said signal divider is electromagnetically coupled to said input port of said switch and to said input port of said second signal level detector, the output signal of said second signal level detector is electromagnetically coupled to said input port of said signal comparator, the output signal of said signal comparator is electromagnetically coupled to said control port of said switch, and the output signal of said switch is electromagnetically coupled to said input port of said indicator.

9. The system of claim 8, further comprising:

a system sensitivity control that produces an output signal at an output port proportional to a first input signal at a first input port multiplied by a second input signal at a second input port, wherein the output signal of the second electromagnetic field detector is electromagnetically coupled to said first input port of said system sensitivity control, a signal having a nominal value between 0 and 1 is electromagnetically coupled to said second input port of said system sensitivity control, and the output signal of said system sensitivity control is electromagnetically coupled to said first input port of said signal divider.

10. The system of claim 8, wherein each of said first and said second electromagnetic field detectors comprises:

a coil that develops an output signal proportional to a strength of a sensed alternating electromagnetic field.

11. The system of claim 10, wherein each of said first and said second electromagnetic field detectors further comprises:

a matched filter electromagnetically coupled to said coil.

12. The system of claim 8, wherein each of said first and said second signal level detectors comprises:

an averaging filter.

13. The system of claim 8, wherein said indicator comprises:

a mixer having a first and a second input port that produces an output signal at an output port, said first input port of said mixer electromagnetically coupled to said output port of said switch;

an oscillator electromagnetically coupled to said second input port of said mixer; and a speaker electromagnetically coupled to the output signal of said mixer.

14. The system of claim 8, wherein said indicator further comprises:

a further comparator that produces an output value at an output port equal to a first control value, if an input signal at an input port is less than a predetermined value, and equal to a second control value, if the input signal is not less than the predetermined value a signal multiplication network that produces an output signal at an output port proportional to a first input signal at a first input port multiplied by a second input signal at a second input port; and a second indicator network that provides an indication of an input signal at an input port, wherein the output signal of said second signal level detector is electromagnetically coupled to said first input port of said signal multiplication network, the output signal of said further comparator is electromagnetically coupled to said second input port of said signal multiplication network, and the output signal of said signal multiplication network is electromagnetically coupled to the input port of said second indicator network.

15. The system of claim 8, wherein each of said first and second signal level detectors comprises an RMS filter.

16. A method for detecting a concealed current carrying conductor, comprising:

generating a first and a second field strength signal proportional to an electromagnetic field of the concealed current carrying conductor;

determining a value for the first field strength signal;

dividing the second field strength signal by the value of the first field strength signal to form an indicator signal;

determining a value for the indicator signal;

determining whether the value of the indicator signal is less than a predetermined value; and generating a conductor detection signal for a user if the value of the indicator signal is not less than the predetermined value.

17. The method of claim 16, further comprising:

adjusting at least one of the first and the second field strength signals to decrease the value of the indicator signal.

18. The method of claim 16, further comprising:

multiplying the second field strength signal by a value between 0 and 1 to decrease the value of the indicator signal.

19. The method of claim 16, further comprising:

multiplying the first field strength signal by a value greater than 1 to decrease the value of the indicator signal.

20. The method of claim 16, wherein the step of generating a conductor detection signal comprises generating an audible signal.

21. The method of claim 16, wherein the step of generating a conductor detection signal comprises generating a visual signal.

22. The method of claim 16, further comprising:

multiplying the value of the conductor detection signal by the value of the indicator signal, to produce a second indicator signal; and generating a visual indication for a user based on the second indicator signal.

* * * * *